Nov. 10, 1970  R. R. JONES  3,539,953

MAGNETICALLY TUNABLE COMB LINE BANDPASS FILTER

Filed July 27, 1967  3 Sheets-Sheet 1

INVENTOR
Raymond R. Jones
BY Spencer & Kaye
ATTORNEYS

INVENTOR
Raymond R. Jones

United States Patent Office 3,539,953
Patented Nov. 10, 1970

3,539,953
MAGNETICALLY TUNABLE COMB LINE
BANDPASS FILTER
Raymond R. Jones, San Jose, Calif., assignor to Western
Microwave Laboratories Inc., Santa Clara, Calif.
Filed July 27, 1967, Ser. No. 656,442
Int. Cl. H03h 7/10
U.S. Cl. 333—73                            2 Claims

ABSTRACT OF THE DISCLOSURE

A magnetically tunable comb line bandpass filter containing a plurality of microwave resonator elements which are each coupled at one end to a common longitudinal member in spaced, parallel relationship to form an array of resonator elements, with a plurality of capacitors each coupled between the other end of a corresponding resonator element and ground, and means for generating a magnetic field at any selected angle with respect to the longitudinal axis of the array of resonator elements to change their resonant frequency or to be colinear with the longitudinal axis. A ferrite is placed adjacent to the array of resonator elements, and electromagnet coils are positioned parallel to and at right angles to the longitudinal axis of the array of resonator elements for selectively generating longitudinal and/or transverse magnetic fields and for varying the angle between the resultant magnetic field and the longitudinal axis of the filter. The filter can be fabricated in printed circuit form by depositing a copper comb line circuit on a ceramic-ferrite substrate which is attached to a conductive ground plane. Mutually perpendicular bias wires are passed through the ceramic substrate underneath the ferrite for producing longitudinal or transverse magnetic fields or a resultant field at any angle therebetween.

BACKGROUND OF THE INVENTION

It is desirable in many microwave applications, particularly in counter measure equipment, to have tunable bandpass microwave filters whose resonant frequency can be very quickly changed by means of a magnetic field variation. Magnetically tunable microwave bandpass filters have been known in the past as described, for example, on pages 1001 to 1086 of "Microwave Filters, Impedance-Matching Networks, and Coupling Structures" by George L. Matthaei, Leo Young, and E. M. T. Jones, which was published by McGraw-Hill in 1964. These prior art filters, however, have the disadvantages of being limited to an extremely narrow bandpass and to slow sweep speeds, and also in having excessive stray coupling, non-uniform RF magnetic fields, and furthermore in being relatively large, complex and costly.

Some advantage could be obtained by using comb line filters but these have either been not tunable at all or tunable only with difficulty.

SUMMARY OF THE INVENTION

With this in mind, it is a main object of this invention to provide a magnetically tunable microwave bandpass filter which overcomes the above-mentioned difficulties of the prior art.

Another object of the invention is to provide a comb line filter whose bandpass can be shifted.

It is another object of the invention to provide a tunable bandpass filter which is simpler, more compact, and easier to manufacture than those heretofore known in the art.

These objects and others ancillary thereto are accomplished in accordance with preferred embodiments of the invention wherein a tunable microwave bandpass filter has been devised by applying the principles of magnetic tuning to comb line bandpass filters. The resonators in this type of filter generally comprise a plurality of microwave transmission line elements which are coupled at one respective end to a common longitudinal member in spaced, parallel relationship to each other to form a comb-like array of resonator elements, with a capacitance between the other end of each resonator element and ground. The capacitance is preferably sufficiently large so that the resonator elements will be approximately $\lambda_0/8$ or less long in physical length where $\lambda_0$ is the wavelength in the medium of propagation at midband.

The application of magnetic tuning to such comb line bandpass filters provides several important advantages. Comb line filters per se are compact and have strong stop bands, and the stop band above the primary passband can be made very broad. If desired, comb line filters can be designed to have an unusually steep rate of cut-off on the high side of the passband. Furthermore, proper coupling can be maintained in manufactured comb line filters without unreasonable tolerance requirements. Moreover, in accordance with this invention, it has been found that the center frequency of such comb line bandpass filters may be shifted over better than half an octave at microsecond rates by means of a variable magnetic field. This frequency shift can be produced by generating a magnetic field at an angle to the longitudinal axis of the comb line filter.

In the preferred embodiment of the invention, thin ferrite elements (actually any ferrimagnetic material can be used and the term "ferrite" as used in this specification and in the claims should not be read in its limitative sense but rather as generic to all ferrimagnetic materials) are placed adjacent to the resonator elements of the comb line filter, and two coils or wires are mounted near the ferrite slabs in perpendicular relation to each other to produce a first magnetic field which is parallel to the longitudinal axis of the comb line filter and a second magnetic field which is transverse to the longitudinal axis of the comb line filter. By switching between the longitudinal and transverse magnetic fields, the center frequency of the comb line bandpass filter can be shifted over better than half an octave at microsecond rates. By directing the magnetic field in an intermediate direction, i.e., by simultaneously energizing both of the electromagnetic coils, the center frequency can be shifted to a point which is between the two extremes.

The magnetically tunable comb line filter of this invention is applicable to integrated circuits wherein the comb line filter is formed by depositing a copper comb line circuit on a ceramic-ferrite substrate which is mounted on a conductive ground plane. In this application, the use of a thin ferrite permits the filter to be used as a latching filter which can be pulse-switched from one center frequency to another by magnetic pulses and which will then remain stable in the switched state after the magnetic pulse is terminated due to the remanence of the thin ferrite slab.

DESCRIPTION OF THE PREFERRED EMBODIMENTS

Figure 1:
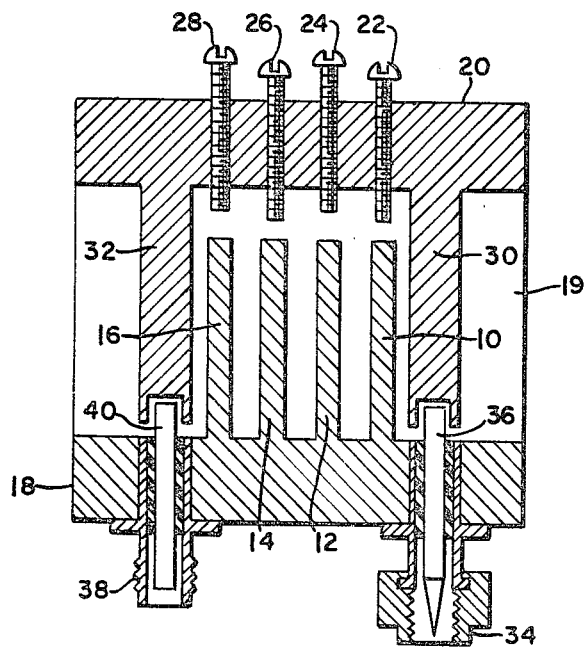
FIG. 1 is a horizontal cross-sectional view of a prior art comb line filter.
Figure 2:
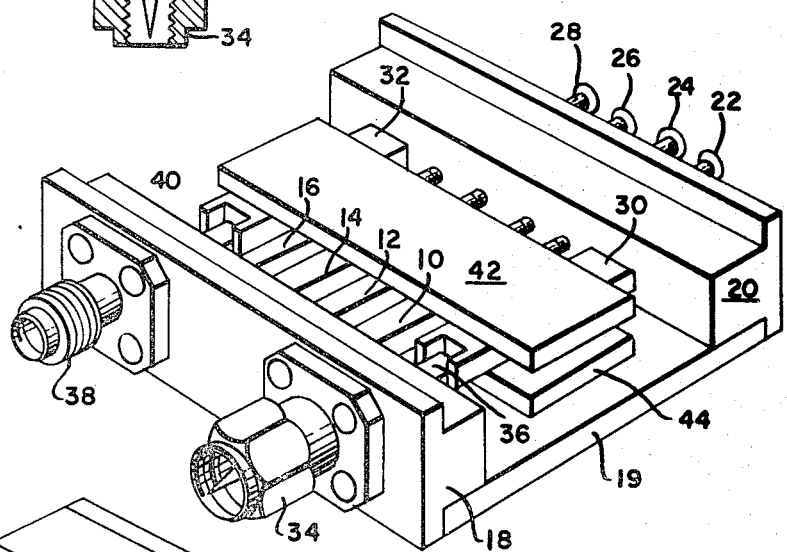
FIG. 2 is a perspective view of one illustrative magnetically tunable comb line filter of this invention with the coils and one wall omitted for clarity.
Figure 3:
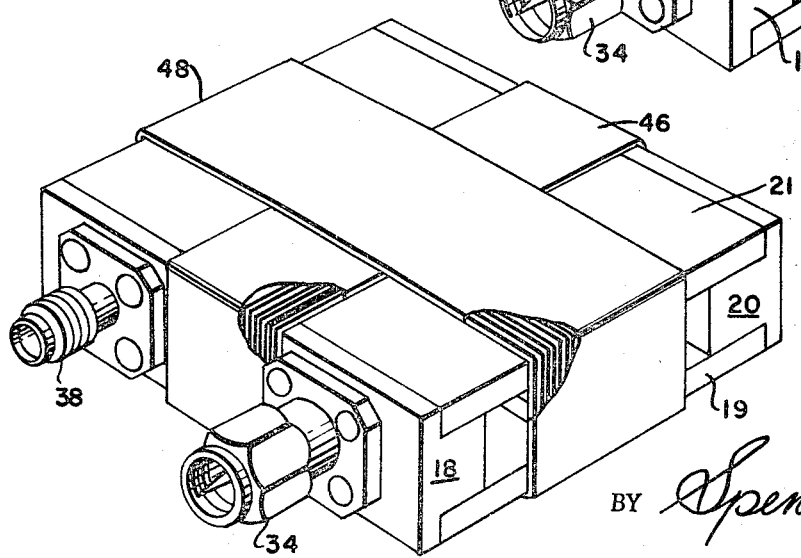
FIG. 3 is a perspective view of the embodiment of FIG. 1 showing a pair of orthogonal coils wrapped therearound.

FIG. 1 shows a prior art comb line filter structure and FIGS. 2 and 3 show illustrative modifications provided in accordance with this invention to render the comb line filter magnetically tunable. Referring to FIG. 1, the illustrated comb line filter is housed in a flat strip-line structure including two side sections 18 and 20 which are made of conductive material with top and bottom sections of an electrically conductive non-ferromagnetic material extending thereinbetween. In FIG. 1, only the bottom section 19 is shown; the top section 21 is shown in FIG. 3. The comb line filter per se comprises a plurality of microwave resonator elements 10, 12, 14 and 16, which in this particular embodiment of the invention are TEM-mode transmission line stubs which are each coupled at one end to a common conductive side section 18 of the flat, strip-line structure to form a comb-like array of resonator elements. The other ends of each of the transmission line elements 10 to 16 is coupled via a corresponding variable capacitor to the other conductive side section 20 of the strip-line structure. These variable capacitor elements are formed by metallic screws 22, 24, 26 and 28, which are engaged in threaded bores through the conductive side section 20 in alignment with a corresponding one of the resonator elements 10 to 16. An input impedance transformer element 30 is connected to side section 20 at one end of the comb-like array of resonator elements, and an output impedance transformer element 32 is connected to side section 20 at the other end of the comb-like array of resonator elements. Input impedance transformer element 30 is coupled to an input coaxial fitting 34 by means of an input probe member 36, and output impedance transformer element 32 is coupled to an output coaxial fitting 38 by means of an output probe member 40.

A detailed discussion of the design principles for comb line bandpass filters such as shown in FIG. 1 can be found on pages 497–518 of the above-noted book "Microwave Flters, Impedance-Matching Networks, and Coupling Structures." It should be noted, however, that the resonator elements 10 to 16 must be less than $\lambda_0/4$ in electrical length at resonance (where $\lambda_0$ is the wavelength in the medium of propagation at midband) and that the capacitances at the ends of the resonance elements are preferably sufficiently large so that the resonator elements will be $\lambda_0/8$ or less in physical length. In this type of filter, the second passband occurs when the resonator line elements are somewhat over ½ wavelength long, so that if the resonator lines are $\lambda_0/8$ in physical length at the primary passband, the second passband will be centered slightly over 4 times the frequency of the center of the first passband. If the resonator elements are less than $\lambda_0/8$ in physical length at the primary passband, the second passband will be even further removed from the primary passband.

Comb line filters of the above-described type have the following advantages:

(1) They are compact;

(2) They have strong stop-bands, and the stop-band above the primary passband can be made to be very broad;

(3) If desired, comb line filters can be designed to have an unusually steep rate of cut-off on the high side of the passband; and (4) Proper coupling can be maintained in manufactured comb line filters without unreasonable tolerance requirements.

Figure 4:
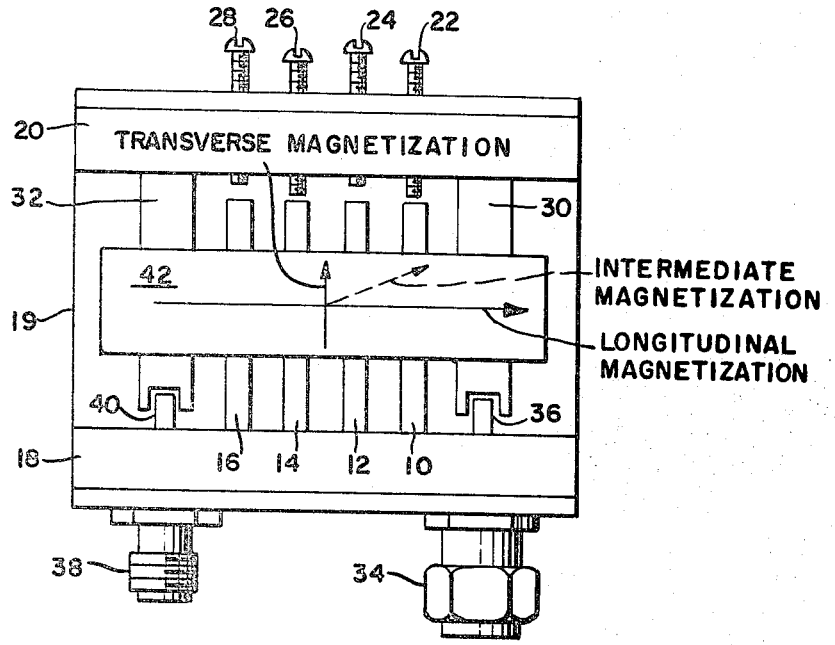
FIG. 4 is a plan view of the embodiment illustrated in FIG. 2.
Figure 5:
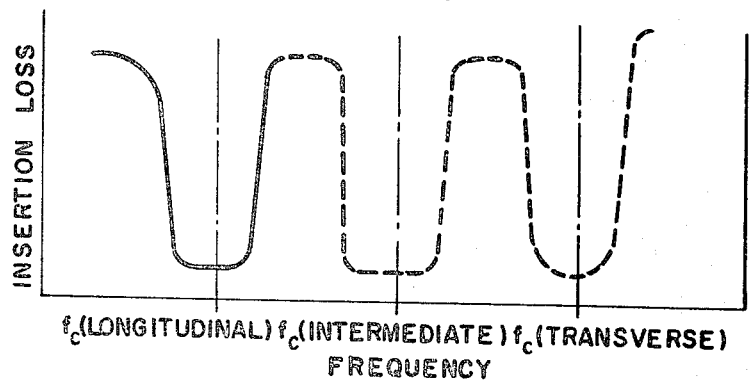
FIG. 5 is a frequency response curve for the embodiments illustrated in FIGS. 2, 3 and 4 for different directions of the magnetic field thereof.

In accordance with this invention, it has been discovered that comb line bandpass filters can be magnetically tuned over better than half an octave at microsecond rates in the L to X frequency bands. As illustrated in FIGS. 2, 3 and 4, it has been found that the prior art comb line filter structure shown in FIG. 1 can be modified for magnetic tuning by adding ferrite elements such as the slabs illustrated in FIG. 2 and a variable magnetic field source such as the electromagnet coils illustrated in FIG. 3. The ferrite slabs 42 and 44 serve both as magnetic core elements and as a dielectric load for the comb line filter. When the ferrite slabs are magnetized in the longitudinal direction of the comb line filter, as indicated in FIG. 4, by passing direct current through coil 46, the dielectrically loaded filter will resonate at the frequency predicted by comb line theory. In the longitudinal magnetization state, no appreciable interaction occurs between the RF magnetic field and the magnetic field of the ferrite slabs, since the two fields are in this case colinear. If, however, the direction of the magnetic field is shifted by energizing coil 48 and de-energizing coil 46 to produce a magnetic field which is transverse to the longitudinal direction of the comb line filter, an interaction will occur between the RF magnetic field and the transverse magnetic field induced by coil 48. Accordingly, the inductive reactance of the resonator elements of the comb line filter will be changed, and the resonator elements will no longer be $\lambda_0/4$ in electrical length at the original center frequency, but rather the center frequency will be shifted to a higher or lower frequency depending on whether the RF signal has been phase-advanced or phase-delayed. Thus, for example, the center frequency of the filter will be shifted from its original value to a higher value as indicated in FIG. 5. By simultaneously energizing the two coils 46 and 48, a magnetic field direction which is intermediate of the longitudinal and transverse directions can be achieved, whereby the center frequency will be shifted by an amount which is intermediate of the two extremes as shown in FIG. 5.

In general terms, the above-described center frequency shift is better than half an octave. In more exact terms, the filter may be designed to give a desired change in center frequency wavelength of $\Delta\lambda_C = \pm 8\Delta\phi$, where $\Delta\lambda_C$ is the change of center frequency wavelength and $\Delta\phi$ is defined by the following equation:

(1) $$\Delta\phi = (\beta_1 - \beta_2)L = \frac{360\sqrt{\epsilon_\nu}}{\lambda_0}(1 - \sqrt{\mu_e})L$$

where $\Delta\phi$ = phase shift in degrees
$\lambda_0$ = free space wavelength (CM)
$\epsilon_\nu$ = relative dielectric constant
$\mu_e$ = real part of effective permeability
$L$ = transverse dimension of ferrite slab (CM)

Equation 1 is derived from fundamental principles as follows:

According to H. Suhl and L. R. Walker, the propagation constant of quasi-TEM mode in longitudinally magnetized parallel plane waveguide is given by (2) $$\beta_2 = \omega\sqrt{\epsilon\mu_0\mu_e}$$

where $$\mu_e = \frac{\mu^2 - k^2}{\mu}$$

$\mu$ and $k$ being the components of the permeability tensor.

With a transverse magnetic field applied to the comb line filter, the real part of $\mu_e$ is given by:

(3) $$\mu_e = 1 - \frac{(\gamma 4\pi M_z)}{\omega^2 + \frac{(\gamma\Delta H)^2}{4}}$$

where $\gamma$=gyromagnetic ratio
$\Delta H$=resonance linewidth
now (4) $\quad \mu_e = \mu'_e - j\mu''_e$ and (5) $\quad \mu''_e = \frac{(\gamma 4\pi M_r)(\gamma \Delta H)}{\gamma \omega^2}\left[1 + \frac{(\gamma 4\pi M_r)^2}{\omega^2}\right]$ assuming $\quad \mu'_e \gg \mu''_e$ and TAN $\delta \ll 1$ (6) $\quad \gamma_2 = \alpha_2 + j\beta_2$ $\quad = j\frac{2\pi}{\lambda_0}\sqrt{\epsilon_r \mu'_e}\left[1 - j1/2\frac{(\mu'_e + \text{TAN }\delta)}{\mu'_e}\right]$ In the longitudinally magnetized state of the comb line filter, the magnetic field is essentially parallel to the RF field, and the ferrite thus behaves like a dielectric.

(7) $\quad \gamma_1 = \alpha_1 + j\beta_1$ $\quad = \frac{j2\pi}{\lambda_0}\sqrt{\epsilon_r}(1 - j1/2 \text{ TAN }\delta)$ The variation in phase shift is therefore given by:

(8) $\quad \Delta\phi = (\beta_1 - \beta_2)L$ $\quad = \frac{360\sqrt{\epsilon_r}}{\lambda_0}(1 - \sqrt{\mu_e})L$ where $\Delta\phi$=phase in degrees
$\lambda_0$=free space wavelength
$\epsilon_r$=relative dielectric constant
$\mu_e$=real part of effective permeability
L=transverse dimension of ferrite slab This relationship is valid for stripline assuming that the spacing between ground planes is less than $\lambda_D/2$. In cases where the spacing between ground planes is greater than $\lambda_D/2$, the relationship would require some modifications which, however, will be clear to those skilled in the art.

The above-described embodiment of the invention can be designed for operation over a wide range of frequencies from the L to the X band. Suitable dimensions of the ferrite for any given frequency can be obtained directly from well known prior art formulas for calculating the parameters of dielectrically loaded comb line filters. The required magnetic field strengths depend upon the operating frequency and in general, the higher the frequency, the smaller the filter. Typically, over a frequency range of 1 to 10 gHz., the applied magnetic field may be in the range of 300 to 3000 oersteds.

Figure 6:
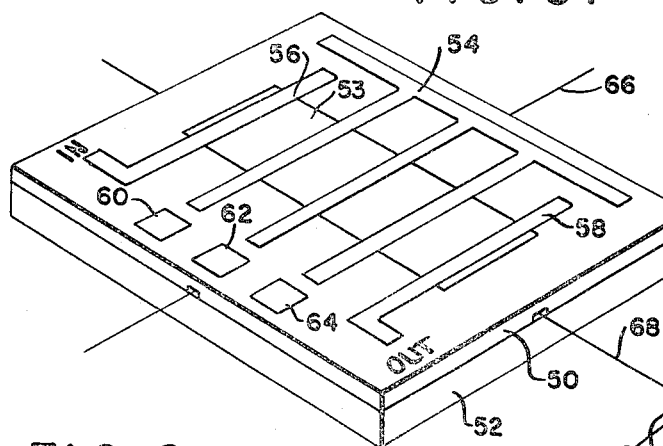
FIG. 6 is a perspective view of another embodiment of the invention which is suitable for use as a latching filter in integrated circuits.

As illustrated in FIG. 6, the magnetically tunable comb line bandpass filter of this invention can also be incorporated into microstrip circuitry, and in this case, through the use of thin ferrite elements (approximately 3–5 mils), the device can act as a latching filter in which magnetic pulses applied to the thin ferrite will switch it from one magnetic state to another, with the magnetic state being retained between switching pulses. As shown in FIG. 6, a ceramic substrate 50 is placed on a conductive ground plane 52 and a ferrite film 53 having a thickness of approximately 3–5 mils is deposited on the ceramic substrate 50. A comb line filter (usually made of brass or aluminum) comprising a comb-shaped resonator section 54, an input impedance transformer element 56, an output impedance transformer 58, and capacitor plates 60, 62 and 64 are deposited on the ceramic-ferrite substrate as shown. The longitudinal portion of section 54 and the capacitor plates 60, 62 and 64 are suitably connected to the ground plane 52. A pair of orthogonally directed bias conductors 66 and 68, or if desired or needed groups of such conductors, are passed through orthogonal bores in the ceramic substrate, the bias wire 68 passing in the longitudinal direction of the ferrite 53, and the bias wire 66 passing in the transverse direction of ferrite 53. By selectively passing current pulses of suitable amplitude through the bias wires 66 and 68, a longitudinal, transverse, or intermediate resultant magnetic field can be set up in the ferrite film 53, and, due to the thinness of the ferrite film, the magnetic field in the ferrite (remanence) will be retained after the current pulses are terminated until the direction of the magnetic field is changed by a further current pulse or current pulses. Accordingly, this embodiment of the invention acts as a latching filter which can be switched between different resonant frequencies and which will remain latched at one resonant frequency until it is switched to another.

A comb or similar type filter which is to be tunable and constructed in accordance with the present invention can be arranged so that the current supply to the coils, that is, the transverse field coil and the longitudinal field coil is switched between a plurality of fixed levels. For example, in a three-position device, which one may consider FIG. 5 as representing, when the longitudinal field coil is energized and the transverse field coil is not energized the bandpass will be as shown on the left side of FIG. 5. When current is provided in the transverse field coil and no current is provided to the longitudinal field coil then the bandpass of the filter will be moved to the right of FIG. 5. Assuming now that the intermediate position for the center frequency of the bandpass is desired then both the longitudinal and transverse field coils will be energized. The device can be this simple or can even be simpler when no intermediate frequency is provided.

Furthermore, the device can be arranged so that it is infinitely variable between the two extremes and this is performed by increasing the current in one coil while decreasing the current in the other coil so that the resultant magnetic field changes its angle with respect to the longitudinal axis of the filter.

While this applies basically to the embodiment shown in FIGS. 2, 3 and 4 it is equally applicable to the FIG. 6 device. However, since the FIG. 6 device is a latching device, only a current pulse is required rather than the constant feeding of current as would be needed in the FIGS. 2, 3 and 4 device. The adjustment in the position of the center frequency of the bandpass can then be effected by changing the amplitude of the pulses, it being understood that the pulses should normally be supplied simultaneously.

Those skilled in the art will realize which types of devices are needed for the proper feeding of current in order to accomplish the desired function.

Figure 7:
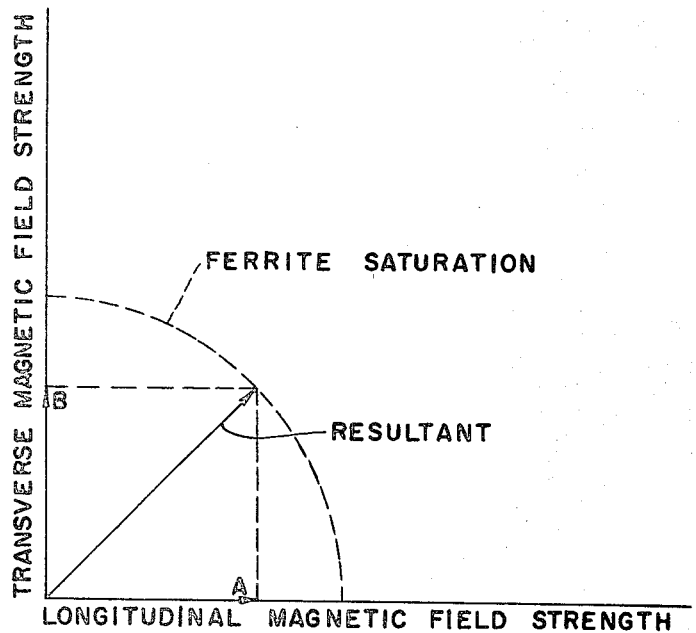
FIG. 7 is a graphical showing of the resultant magnetic field.

Referring to FIG. 7, a ferrite saturation curve is shown in dotted lines. The ferrite should be at saturation at all positions of the resultant magnetic field in order to assure the bandpass characteristic to have the shape shown in FIG. 5. Otherwise, some change in this characteristic may occur and this is normally undesirable although in certain instances it can be used to advantage. The longitudinal magnetic field strength and transverse magnetic field strength are normally such that the resultant follows the ferrite saturation curve shown. Thus, except for the longitudinal magnetization and transverse magnetization, both coils will be simultaneously energized. Assuming for example that a 45° resultant is desired, then the longitudinal magnetic field strength would be A and the transverse magnetic field strength would be B where $A = B$ in order to provide a 45° resultant which is at least at ferrite saturation. As can be seen the longitudinal and transverse magnetic field strengths can be less than saturation to produce a resultant which is at saturation, thereby conserving energy.

Figure 8:
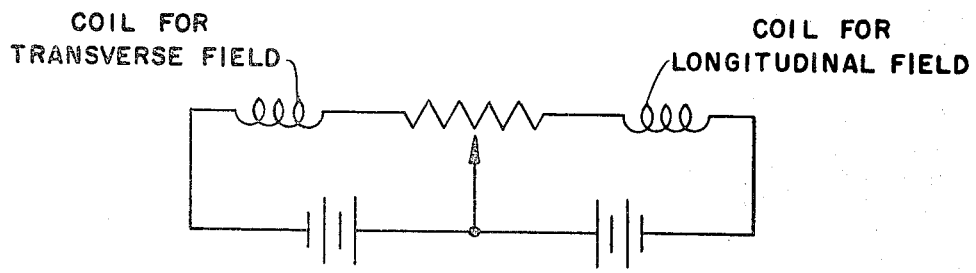
FIG. 8 is a diagrammatic view of one circuit for energizing the coils.

FIG. 8 is a schematic showing of one manner of accomplishing the present invention. Although the rheostat is provided with a wiper arm which can be manually adjustable, it should be readily apparent that this would usually be performed electronically. As the wiper arm is moved in one direction or the other the coil for the longitudinal field will receive more or less current and the coil for the transverse field will receive current in inverse relationship thereto. The arrangement is such that at the extreme ends of the wiper arm travel one coil will receive no current and the other will receive a maximum.

By suitably arranging the circuit of FIG. 8, instead of the coils, the bias wires of the FIG. 6 embodiment can be provided and by propagating the necessary pulses with the correct amplitudes can be fed so that the bandpass of the filter can be adjusted as desired.

It should be understood, that the above-described embodiments are merely illustrative of the invention and that many other different forms of the invention are possible.

Many other modifications are posisble in the disclosed structure without departing from the basic principles of this invention. For example, it is possible to use some other type of microwave input and output coupling in place of the coaxial couplings disclosed in the drawings, and fixed capacitor elements could be used if desired in place of the variable capacitor elements disclosed in the drawings. These and many other modifications of the disclosed structure will be apparent to those skilled in the art, and it will be understood that all of these modifications, changes and adaptations are intended to be comprehended within the meaning and range of equivalents of the appended claims.

I claim:

1. A magnetically tunable bandpass filter, comprising, in combination: first and second electrically conductive members whose longitudinal axes define the longitudinal axis of the filter; a plurality of microwave resonator elements each coupled at one end thereof to said first electrically conductive member in spaced, parallel relationship to the others to form an array of resonator elements; capacitor means coupled between the other ends of the microwave resonator elements and said second electrically conductive member; microwave input means coupled to one end of said array of resonator elements; microwave output means coupled to the other end of said array of resonator elements; at least one film of ferrite material positioned adjacent to said array of resonator elements; means for generating a resultant magnetic field at an angle to the longitudinal axis of the filter to change the resonant frequency thereof, said means for generating a magnetic field comprising a linear current conductor positioned with its magnetic axis at an angle to the longitudinal axis of said comb-like array of resonator elements; said microwave resonator elements, said first electrically conductive member, said capacitor elements, said microwave input means, and said microwave output means all comprising films of conductive material supported by a ceramic substrate; said second electrically conductive member comprising a conductive material which supports said ceramic substrate; a second linear current conductor positioned at an angle to the first mentioned linear current conductor, said film of ferrite material being switchable between at least a first magnetization state and a second magnetization state in response to transient current pulses through said linear current conductors.

2. The filter defined in claim 1 wherein said film of ferrite material is positioned on top of said ceramic substrate, said array of resonator elements is positioned on top of said film of ferrite material, and said linear current conductors are positioned within said ceramic substrate.

References Cited
UNITED STATES PATENTS

| | | | |
|---|---|---|---|
| 3,200,353 | 8/1965 | Okwit | 333—24.1 |
| 3,327,255 | 6/1967 | Bolljahn | 333—73 |
| 3,391,356 | 7/1968 | Bolljahn | 333—73 |
| 3,310,759 | 3/1967 | Ogasawara | 333—1.1 |
| 3,425,003 | 1/1969 | Mohr | 333—24.1 |

HERMAN KARL SAALBACH, Primary Examiner

C. BARAFF, Assistant Examiner

U.S. Cl. X.R.

315—3.5; 333—24.2, 84, 83